(12) United States Patent
Choi et al.

(10) Patent No.: US 6,673,740 B2
(45) Date of Patent: Jan. 6, 2004

(54) METHOD FOR PREPARING A CATALYST FOR REDUCTION OF NITROGEN OXIDES

(75) Inventors: Kyung-Il Choi, Taejon (KR); Sang-Ho Lee, Taejon (KR); Choul-Woo Shin, Taejon (KR); Jun-Seong Ahn, Taejon (KR); Jong-Hyun Kim, Taejon (KR); Bong-Jea Kim, Taejon (KR)

(73) Assignee: SK Corporation, Seoul (KR)

( * ) Notice: Subject to any disclaimer, the term of this patent is extended or adjusted under 35 U.S.C. 154(b) by 269 days.

(21) Appl. No.: 09/963,273

(22) Filed: Sep. 25, 2001

(65) Prior Publication Data

US 2002/0061817 A1 May 23, 2002

(30) Foreign Application Priority Data

Sep. 27, 2000 (KR) .......................................... 2000-56680

(51) Int. Cl.$^7$ ............................................. B01J 23/883
(52) U.S. Cl. ........................ 502/309; 502/312; 502/315; 502/321
(58) Field of Search ................................. 502/305, 309, 502/312, 315, 321, 350

(56) References Cited

U.S. PATENT DOCUMENTS

| 5,827,489 A | 10/1998 | Garcin et al. ............ 423/239.1 |
| 6,171,566 B1 | 1/2001 | Ku et al. ................. 423/239.1 |

*Primary Examiner*—Stanley S. Silverman
*Assistant Examiner*—Edward M. Johnson
(74) *Attorney, Agent, or Firm*—Abelman, Frayne & Schwab

(57) ABSTRACT

The catalyst is prepared by recycling a spent catalyst discharged from a hydro-desulfurization process of an oil refinery in which the spent catalyst comprises an alumina support with a large specific surface area impregnated with low contents of vanadium and high contents of molybdenum. The thus prepared catalyst has more excellent selective removal activity of nitrogen oxides at a high temperature window by containing suitable amounts of metal components therein as well as a better poisoning resistance to sulfur oxides, compared with the conventional catalysts.

11 Claims, 1 Drawing Sheet

METHOD FOR PREPARING A CATALYST FOR REDUCTION OF NITROGEN OXIDES

BACKGROUND OF THE INVENTION

1. Field of the Invention

The present invention relates, in general, to a catalyst for selective catalytic reduction of nitrogen oxides at high temperature window More specifically, the present invention relates to a preparation of a catalyst for selective catalytic reduction of nitrogen oxides at high temperature window, which is prepared by recycling an alumina-based spent catalyst discharged from a hydro-desulfurization process of an oil refinery.

2. Description of the Prior Art

Generally, nitrogen oxides are found to be a main cause of acid rain and photooxidation negatively affecting the environment, along with hydrocarbon. Now, most countries including Korea strictly forbid the discharge of nitrogen oxides above the allowed standard levels. Accordingly, a technique for removing nitrogen oxides from waste gas in a combustion system has been devised.

Techniques for effectively eliminating nitrogen oxides ($NO_x$) are commonly classified into a selective catalytic reduction (SCR) using a catalyst and a reductant together, a selective non-catalytic reduction (SNCR) using only a reductant without a catalyst, a low-$NO_x$ burner technique controlling a combustion state in the burner and so on. Among them, the selective catalytic reduction is valued as an effective technique for removing nitrogen oxides, taking notice of the generation of secondary pollution, removal efficiency, operation cost, etc. By using the selective catalytic reduction technique, nitrogen oxides may be removed with an efficiency of 90% or greater and the endurance period thereof may be used for about 2–5 years. In addition, said technique is technically advantageous because poisonous dioxin may be removed, along with nitrogen oxides, in the incinerator.

Catalysts useful in the selective catalytic reduction are classified into an extruded honeycomb catalyst, a metal plate catalyst, and a pellet catalyst, depending on their external forms. Currently, the extruded honeycomb and the metal plate catalysts are widely used in steam power plants and incinerators. Useful as a support of the catalysts are titania, alumina, silica, zirconia and so on, and the catalyst composition mainly comprises oxides of active metals such as vanadium, molybdenum, nickel, tungsten, iron, and copper, and further comprises other active metal components for broadening temperature ranges and enhancing durability of the catalyst.

It became recently known that a catalyst for selective catalytic reduction can be manufactured containing oxides of crystalline phases by impregnating a support of inorganic oxides such as titania, alumina, silica and zirconia with catalytic components such as vanadium, molybdenum, nickel and tungsten, followed by thermal treatment.

In this regard, U.S. Pat. No. 5,827,489 discloses a process for the preparation of a catalyst for selective catalytic reduction containing oxides of crystal phases by impregnating a support of inorganic oxides such as titania, alumina, silica and zirconia with catalytic components such as vanadium, molybdenum, nickel and tungsten, thereafter heat treating. This patent employs a support and catalytic components with a superior poisoning resistance to sulfur oxides for the selective catalytic reduction and has advantages of freely controlling the amounts of active metals, a specific surface area and pore sizes of the catalyst to prepare the catalyst having optimal performance in which a suitable amount of sulfate is added. On the other hand, it suffers from high preparation cost because each of single materials (or precursors) used as the support and the catalyst should be prepared by methods of catalyst production and mixing.

Thus, the catalyst for selective catalytic reduction of nitrogen oxides may be prepared to show a catalytic activity at low, medium or high-temperature window by freely selecting a support with poisoning resistance to sulfur oxides, moisture and dusts, an impregnated amount of active metals, and a specific surface area and pore size of the support. For example, platinum-based catalysts are used at low temperature, vanadium-impregnated titania catalysts at medium temperature and zeolite catalysts at high temperature.

In the case of a catalyst at high temperature window for the selective catalytic reduction, it is commonly required to have a large specific surface area and contain limited amounts of active metals therein. A large specific surface area is intimately associated with the crystalline structure of the support. The support having larger specific surface area is exemplified by titania having anatase crystalline structure, alumina having gamma alumina crystalline structure and zeolite such as mordenite. Useful as active metals at high temperature window are vanadium, tungsten, molybdenum and so on, of which vanadium should be used at a suitable amount or less, and molybdenum and tungsten at a suitable amount or more.

In catalysts as described above, the catalyst comprising a titania support having anatase crystalline structure impregnated with vanadium is most preferably used as the catalyst for selective catalytic reduction in terms of performance and durability of the catalyst. However, said catalyst is only usable in limited temperature ranges of 200–400° C., preferably 250–350° C., which is attributed to characteristics of vanadium, and specific surface areas and pore sizes of titania support. In particular, titania with an anatase crystalline structure has larger specific surface area due to a great quantity of micropores and is phase-changed into rutile crystalline structure having a specific surface area of 10 $m^2/g$ at about 550° C. Meanwhile, gamma alumina is limitedly used because of poisoning attributable to sulfur oxides from exhaust gas. However, gamma alumina is phase-changed into a structure having a specific surface area of about 1–5 $m^2/g$ at 1000° or higher, therefore it is suitable for a support at high temperature window, if poisoning problems are solved. The extruded zeolite-based catalyst, which has good catalytic performance at high temperatures of 400–600° C., is not widely used owing to extrusion difficulty attributed to larger specific surface area and poisoning caused by moisture. As it is, the catalyst at high temperature window has been applied to gas turbines, engines for ships, and power plants at temperatures of 500° C. or lower, Meanwhile, oil refineries essentially employ a hydro-desulfurization process for removing sulfur components contained in crude oil, from which a spent catalyst is discharged as a by-product. However, if such a spent catalyst is not recycled, treatment costs therefor are required continuously, which is disadvantageous in the economic aspect.

In this regard, Korean Patent Laid-Open No. 95-72277 and U.S. Pat. No. 6,171,566 refer to recycling of spent catalysts discharged from a hydro-desulfurization process of an oil refinery. A catalyst for selective catalytic reduction prepared by recycling such spent catalysts is more advantageous in terms of low preparation cost, inherent poisoning resistance to sulfur oxides, and containing the high content of metal components with excellent activities for nitrogen oxides reduction, compared with a catalyst prepared by a combination process of single materials. However, spent catalysts usable in the preparation of the catalyst for selective catalytic reduction may be recycled with only a 30% recovery rate on the basis of the whole discharged amounts of the whole spent catalysts, and thus intensive research for solving said problems has been carried out.

SUMMARY OF THE INVENTION

Leading to the present invention, the intensive and thorough research on a spent catalyst discharged from a hydro-desulfurization process of an oil refinery, carried out by the present inventors aiming to avoid the problems encountered in the prior arts, resulted in the finding that a spent catalyst comprising an alumina support (preferably gamma alumina) with a large specific surface area impregnated with low contents of vanadium and high contents of molybdenum may be recycled to prepare a catalyst for selective catalytic reduction of nitrogen oxides. When used in selective catalytic reduction in the presence of ammonia as a reducing agent, the thusly prepared catalyst has more excellent selective removal activity of nitrogen oxides at high temperature window by containing suitable amounts of metal components therein and a better poisoning resistance to sulfur oxides, compared with those of the conventional catalysts.

Therefore, It is an object of the present invention to provide a catalyst having an excellent selective removal activity of nitrogen oxides at high temperature window and a good poisoning resistance to sulfur oxides.

It is another object of the present invention to provide a method for preparing a catalyst for selective catalytic reduction of nitrogen oxides at high temperature window using a spent catalyst discharged from a hydro-desulfurization process of an oil refinery.

In accordance with the present invention, there is provided a method for preparing a catalyst for selective catalytic reduction of nitrogen oxides at high temperature window comprising the following steps:

a) pretreating a spent catalyst discharged from a hydro-desulfurization process of an oil refinery, which comprises 4 wt % or less of vanadium, 4 wt % or less of nickel, 5 wt % or more of molybdenum and 1 wt % or less of sulfur on an alumina support by thermally treating said spent catalyst followed by washing with water;

b) providing a titania impregnated with 3 to 10 wt % of tungsten on the basis of titania weight;

c) pulverizing the pretreated spent catalyst, followed by homogeneously mixing the pulverized spent catalyst with the tungsten-impregnated titania under the addition of water and acid;

d) dehydrating the mixture to remove excess moisture and active metal components therein;

e) drying the dehydrated mixture at 100 to 200° C. for 9 hours or longer, followed by grinding the dried mixture; and f) forming a catalyst body by extruding the grinded mixture or coating the grinded mixture to a structure, followed by drying under a constant temperature and humidity condition and then calcining the dried structure.

BRIEF DESCRIPTION OF THE DRAWING

The above and other objects, features and other advantages of the present invention will be more clearly understood from the following detailed description taken in conjunction with the accompanying drawing, in which.

DETAILED DESCRIPTION OF THE INVENTION

Figure 1:
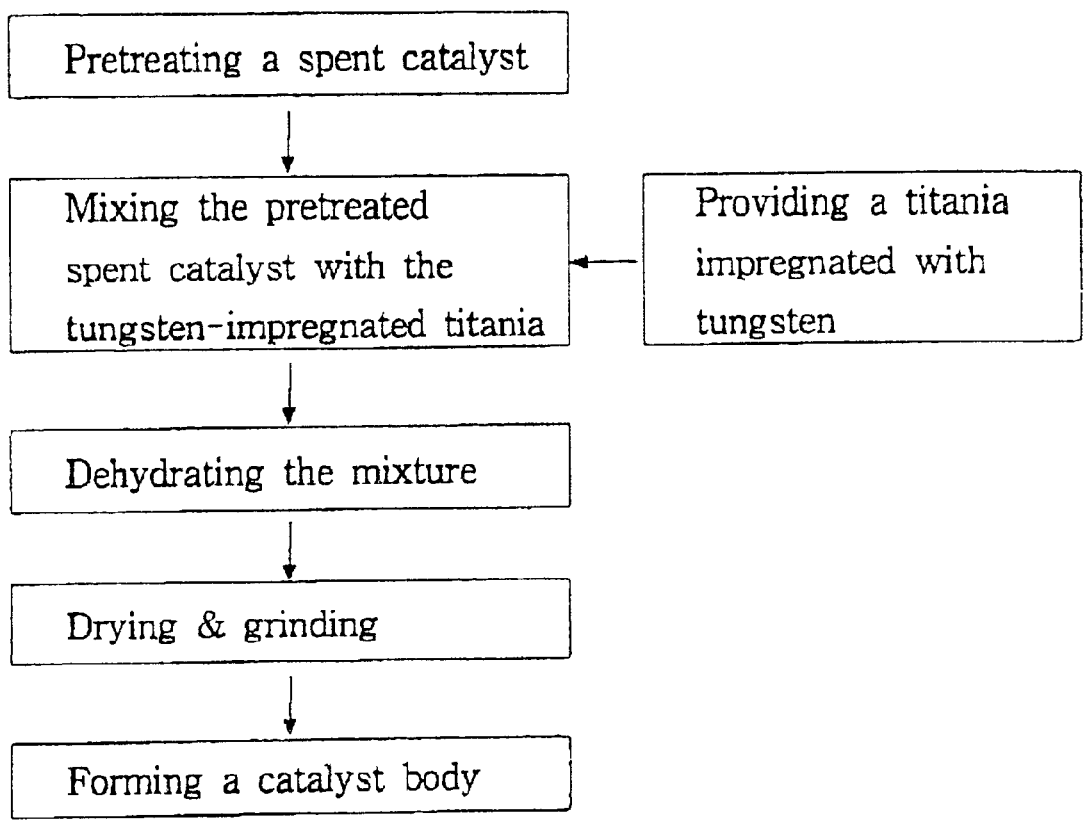
FIG. 1 shows a diagram of processes for preparing a catalyst for selective catalytic reduction of nitrogen oxides at high temperature window, using a spent catalyst, according to the present invention.

With reference to FIG. 1, there is shown a process of preparation of a catalyst for selective catalytic reduction of nitrogen oxides at high temperature window according to the present invention.

In the present invention, use is made of a spent catalyst discharged from a hydro-desulfurization process of an oil refinery, which has poisoning resistance to sulfur oxides. At this time, the spent catalyst comprises an alumina support impregnated with low contents of vanadium and high contents of molybdenum. The spent catalyst comprises 4 wt % or lower of vanadium, 4 wt % or lower of nickel, 5 wt % or higher of molybdenum and 1 wt % or lower of sulfur on an alumina support, preferably a gamma alumina support, which has relatively large specific surface area of 100–180 $m^2/g$ and pore sizes of 100–180 Å. The reason why the spent catalyst comprising low contents of vanadium and nickel and high contents of molybdenum is used is that the catalyst of the present invention should have catalytic activities at high temperature window and poisoning resistance to sulfur oxides.

In particular, if the content of vanadium exceeds 4 wt %, the finally prepared catalyst oxidizes sulfur dioxides into sulfur trioxide during a selective catalytic reduction process of nitrogen oxides contained in an exhausted gas with large amounts of sulfur at high temperature, in the presence of ammonia. Further, when sulfur is present in amounts exceeding 1 wt %, this component acts as catalytic poison and thus activity of the prepared catalyst is lowered. Meanwhile, in order to eliminate oil, carbon and a part of sulfur in the spent catalyst present in combination with various impurities, the spent catalyst is thermally treated, preferably at 300–400° C. for 3–5 hours. At this thermal treatment temperature, which is the standard processing condition, carbon and a part of sulfur (especially, carbon) may be effectively eliminated. Thereafter, the thermally treated spent catalyst is washed with water, preferably, for about 1 hour in an batch-typed aeration bath to remove sulfur and excess metal components accumulated in the spent catalyst.

In addition to the spent catalyst, tungsten-impregnated titania is provided and then mixed with said pretreated spent catalyst. When titania is impregnated with tungsten, ammonium meta tungstate, which is soluble in water, is preferably used. As such, tungsten-impregnated titania has a specific surface area of 50–100 $m^2/g$ and pore size of 150–200 Å, and also anatase crystalline structure. In this case, the tungsten is impregnated at an amount of 3–10 wt % on the basis of titania weight.

Thereafter, the pretreated spent catalyst is pulverized, and then homogeneously mixed with tungsten-impregnated titania at a weight ratio of 50:50–70:30. If the amount of the spent catalyst is less than 50 wt %, active metals are deficient in the mixture and its specific surface area becomes excessively large. On the other hand, when the spent catalyst exceeds 70 wt %, an excess amount of active metals are present in the mixture and its specific surface area becomes too small.

Said pulverizing and mixing steps are conducted using a ball mill reactor for, preferably about 3–4 hours, in which suitable amounts of water and acid are added to obtain mixture of slurry state. At that time, the acid is used for dissolving excess metal components contained in the spent catalyst. Such dissolved active metals are re-distributed into the titania support impregnated with tungsten. In other words, active metal components are dissolved in acids so that the alumina support of the spent catalyst has much larger specific surface area and excess active metals are adsorbed into pores in the tungsten-impregnated titania support with large specific surface area. The acids should dissolve active metals such as vanadium, nickel, molybdenum, and organic components. As such, the acids are used at a suitable amount because excess addition of the acids results in dissolving the alumina support as well as metals. Such acids are exemplified by oxalic acid and added preferably at an amount of 1–5 wt % on the basis of the spent catalyst, depending on metal components contained in the spent catalyst.

Thereafter, the slurry mixture is uniformly dehydrated under a pressure of about 15 kg/cm$^2$ by use of a filter press to eliminate excess moisture and metal components, thereby yielding a dehydrated cake.

Said dehydrated cake is dried at 100–200° C. for about 9 hours or more and then grinded to a particle size of preferably 100 mesh or higher. This drying step, in which moisture is removed, is conducted to primarily impregnate tungsten-impregnated titania with the dissolved active metals remaining after the added water and acid are eliminated. The grinded mixture is extruded preferably into honeycomb or coated to a structure to form a catalytic body, which is then dried preferably at 100–120° C. under a constant temperature and humidity condition for 24 hours or higher, followed by calcining preferably at 450–550° C. for 3 hours, thereby preparing a catalyst of the present invention. It is preferred that sparking metal or ceramics such as cordierite are used as said structure.

In accordance with the present invention, the catalyst for selective catalytic reduction of nitrogen oxides at high temperature prepared as above comprises 1–3 wt % of vanadium, 1–3 wt % of nickel, 2–8 wt % of molybdenum and 1–7 wt % of tungsten on the mixture support of alumina and titania, and has properties such as a specific surface area of 100–150 m$^2$/g and pore sizes of 120–180 Å. In addition, the catalyst of the present invention has a conversion rate of nitrogen oxides of 90% or more over an active temperature window of 240–480° C. Particularly, because vanadium, which oxidizes sulfur dioxides into sulfur trioxides, is contained at a low amount in the catalyst, the present catalyst can selectively reduce nitrogen oxides contained in an exhausted gas with large amounts of sulfur components at high temperature in the presence of ammonia as a reducing agent.

A better understanding of the present invention may be obtained in light of the following examples which are set forth to illustrate, but are not to be construed to limit the present invention.

EXAMPLE 1

A spent catalyst, deprived of impurities, discharged from a hydro-desulfurization process was thermally treated at 400° C. for 3 hours, followed by washing with water, which is referred to as "Catalyst A".

Ammonium meta tungstate was added to Meta titanic acid slurry with solid content of 20–25 wt %, admixed homogeneously, in which the ammonium meta tungstate was added at an amount of 5 wt % on the basis of the solid weight of the slurry, and thereafter, thermally treated at 550° C. for 2 hours, which is referred to as "Catalyst B".

250 g of Catalyst A was pulverized and mixed with 250 g of Catalyst B in the ball mill reactor, and the mixing step was conducted under the addition of 500 g of water and 8 g of oxalic acid. Next, the mixture was filter pressed under 15 kg/cm$^2$, dried at 120° C. for 24 hours, and grinded to a particle size of 120 mesh. Thereafter, calcination was carried out at 450° C. for 3 hours to give a catalyst in the powder form, which is referred to as "Catalyst C".

Each chemical composition of the Catalysts A, B and C was analyzed using XRP and ICP methods as given in Table 1, below.

TABLE 1

| | Componets (wt %) | | | | | | | | | | |
|---|---|---|---|---|---|---|---|---|---|---|---|
| Catalyst | V | Ni | Mo | W | Si | P | Fe | Nb | S | Al | Ti |
| A | 2.8 | 3.6 | 8.2 | ND[1] | 0.1 | 0.1 | 0.4 | ND | 0.8 | 38.8 | ND |
| B | ND | ND | ND | 4.9 | ND | 0.1 | 0.2 | 0.2 | ND | ND | 55.1 |
| C | 1.5 | 1.9 | 4.0 | 2.7 | T[2] | T | T | T | 0.5 | 18.4 | 29.5 |

[1]not detected;
[2]traced

Furthermore, the physical properties of Catalysts A, B and C were determined as shown in Table 2, below.

TABLE 2

| | Catalyst Property | |
|---|---|---|
| Catalyst | Specific surface area (m$^2$/g) | Pore Size (Å) |
| A | 131.5 | 152 |
| B | 80.2 | 201 |
| C | 112.5 | 172 |

The performance test of the catalysts A, B and C were conducted in the presence of nitrogen monoxide (NO) 500 ppm and ammonia (NH$_3$) 500 ppm, under severe conditions of a gaseous hourly space velocity of 100,000/hr, and reaction temperature was raised at a rate of 5° C./min. in the range of 30° C. to 500° C. The results are presented in Table 3, below.

TABLE 3

| Catalyst | Catalyst performance | |
|---|---|---|
| | Max. Activity (%) | Activity Range (° C.)[3] |
| A | 80 | ND |
| B | 70 | ND |
| C | 100 | 240–480 |

Note:
[3]range having activity of 90% or higher

As can be seen in the above tables, the Catalyst C with a specific surface area of 100–150 m²/g and pore sizes of 120–180 Å, comprising 1–3 wt % of vanadium, 1–3 wt % of nickel, 2–8 wt % of molybdenum and 1–7 wt % of tungsten, has a nitrogen reduction catalytic activity of 100% over an active temperature range of 240–480° C. and thus is suitable for use in selective catalytic reduction of nitrogen oxides at high temperature window.

EXAMPLE 2

A mixture material for a catalyst body was prepared in the same manner as Catalyst C in Example 1, except that calcination was not carried out. 46 wt % of the mixture material, 42 wt % of water, 1 wt % of light mineral oil, 4 wt % of methyl cellulose, 3 wt % of glass fiber and 4 wt % of Kaolinite were mixed, kneaded, and extruded into honeycomb forms having 100 cells and 25 cells, respectively. Each of the extruded honeycombs was dried 120° C. for 24 hours and calcined at 450° C. for 3 hours to give a Catalyst D.

The chemical composition of the Catalyst D was analyzed using XRF and ICP methods as given in Table 4, below.

TABLE 4

| Catalyst | Components (wt %) | | | | | | |
|---|---|---|---|---|---|---|---|
| | V | Ni | Mo | W | Si | Al | Ti |
| D | 1.5 | 1.9 | 4.1 | 2.6 | 3.3 | 19.0 | 31.0 |

The Catalyst D was tested for removal activity of nitrogen oxides in the presence of ammonia as a reducing agent. The performance test of the catalyst body was conducted in the presence of 500 ppm nitrogen monoxide (NO) and 500 ppm ammonia (NH₃), under operating conditions of a selective catalytic reduction reactor of a gaseous hourly space velocity of 5,000/hr, and reaction temperature was increased at a rate of 5° C./min. in the range of 30° C. to 500° C. The results are given in Table 5, below.

TABLE 5

| Catalyst Body | Catalyst Performance | |
|---|---|---|
| | Maximum Activity (%) | Active Temp. Range (° C.)[1] |
| 100 cell | 100 | 240–460 |
| 25 cell | 100 | 260–480 |

Note:
[1]range having activity of 90% or higher

From the results of the above table, it is found that the removal activity of the catalyst body is excellent at a high temperature range of 240–480° C.

Therefore, when a catalyst prepared according to a method of the present invention and a catalyst comprising titania or alumina support alone is used as a catalyst for selective catalytic reduction at high temperature window, the former catalyst has more excellent catalytic performances compared with the latter catalyst. In accordance with the present invention, since a spent catalyst can be recycled at a maximum efficiency, the cost for preparation of the catalyst may be lowered. In addition, the present catalyst has an excellent poisoning resistance to sulfur oxides. Accordingly, high removal efficiency of nitrogen oxides in an exhaust gas containing large amounts of sulfur at high temperature may be obtained.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for preparing a catalyst for selective catalytic reduction of nitrogen oxides at high temperature, comprising the following steps of:

a) pretreating a spent catalyst discharged from a hydrodesulfurization process of an oil refinery, which comprises 4 wt % or less of vanadium, 4 wt % or less of nickel, 5 wt % or more of molybdenum and 1 wt % or less of sulfur on an alumina support by thermally treating said spent catalyst followed by washing with water;

b) providing a titania impregnated with 3 to 10 wt % of tungsten on the basis of titania weight;

c) pulverizing the pretreated spent catalyst, followed by homogeneously mixing the pulverized spent catalyst with the tungsten-impregnated titania under the addition of water and acid;

d) dehydrating the mixture to remove excess moisture and active metal components therein;

e) drying the dehydrated mixture at 100 to 200° C. for 9 hours or longer, followed by grinding the dried mixture; and f) forming a catalyst body by extruding the grinded mixture or coating the grinded mixture to a structure, followed by drying under a constant temperature and humidity condition and then calcining the dried structure.

2. The method as defined in claim 1, wherein the acid in the c) step is oxalic acid and is added at an amount of 1 to 5 wt % on the basis of the spent catalyst.

3. The method as defined in claim 1, wherein the titania has anantase crystalline structure.

4. The method as defined in claim 1, wherein the alumina support in the spent catalyst has a specific surface area of 100 to 180 m²/g and a pore size of 100 to 180 Å.

5. The method as defined in claim 1, wherein the spent catalyst and the tungsten-impregnated titania are mixed at weight ratio of 50:50 to 70:30 in the c) step.

6. The method as defined in claim 1, wherein the alumina support is made of a gamma alumina.

7. The method as defined in claim 1, wherein the thermally treating of the a) step is carried out at 300 to 400° C. for 3 to 5 hours.

8. The method as defined in claim 1, wherein the drying of the f) step is carried out at 100 to 120° C. for 24 hours or more.

9. The method as defined in claim 1, wherein the calcining of the f) step is carried out at 450 to 550° C. for 3 hours or more.

10. The catalyst prepared according to claim 1, wherein the catalyst comprises 1 to 3 wt % of vanadium, 1 to 3 wt % of nickel, 2 to 8 wt % of molybdenum, and 1 to 7 wt % of tungsten on the mixture support of alumina and titania, and has a specific surface area of 100 to 150 m$^2$/g and a pore size of 120 to 180 Å.

11. The catalyst as defined in claim 10, wherein the catalyst has an active temperature range of 240 to 480° C.

* * * * *